(12) United States Patent
Noe et al.

(10) Patent No.: US 10,960,375 B2
(45) Date of Patent: Mar. 30, 2021

(54) METHOD FOR REVAMPING VERTICAL CONVERTERS HAVING A FLANGED PRESSURE SHELL EXTENSION FOR HOUSING AN INTERNAL HEAT EXCHANGER

(71) Applicant: Kellogg Brown & Root LLC, Houston, TX (US)

(72) Inventors: Stephen Allen Noe, Tomball, TX (US); Sachin Kalatrakkal, Houston, TX (US); Shiliang Zhan, Houston, TX (US); Deyuan Wu, Houston, TX (US)

(73) Assignee: KELLOGG BROWN & ROOT LLC., Houston, TX (US)

( * ) Notice: Subject to any disclaimer, the term of this patent is extended or adjusted under 35 U.S.C. 154(b) by 0 days.

(21) Appl. No.: 16/047,936

(22) Filed: Jul. 27, 2018

(65) Prior Publication Data

US 2019/0134587 A1    May 9, 2019

Related U.S. Application Data

(60) Provisional application No. 62/537,674, filed on Jul. 27, 2017.

(51) Int. Cl.
| | |
|---|---|
| *B23P 15/26* | (2006.01) |
| *B01J 8/04* | (2006.01) |
| *C01C 1/00* | (2006.01) |
| *B01D 3/14* | (2006.01) |
| *B01D 3/00* | (2006.01) |
| *B01J 8/00* | (2006.01) |
| *B01J 8/02* | (2006.01) |

(Continued)

(52) U.S. Cl.
CPC ............. *B01J 8/0496* (2013.01); *B01D 3/00* (2013.01); *B01D 3/14* (2013.01); *B01D 5/0027* (2013.01); *B01J 8/001* (2013.01); *B01J 8/025* (2013.01); *B01J 8/0415* (2013.01); *B01J 8/0446* (2013.01); *B01J 8/0453* (2013.01); *B01J 8/0492* (2013.01); *B23P 15/26* (2013.01); *C01C 1/00* (2013.01); *C01C 1/02* (2013.01); *C01C 1/0405* (2013.01); *B01J 2208/0053* (2013.01); *B01J 2208/00115* (2013.01); *B01J 2208/00132* (2013.01); *B01J 2208/00212* (2013.01); *B01J 2208/00362* (2013.01); *B01J 2219/00024* (2013.01)

(58) Field of Classification Search
CPC ...... B01J 8/0496; B01J 8/0446; B01J 8/0492; B01J 2208/00115; B01J 2208/00132; B01J 2208/00362; B01J 2208/0053; B01J 8/0415; B01J 2208/00212; B01J 2219/00024; B01J 8/001; B01J 8/025; B01J 8/0453; B23P 15/26; C01C 1/0405; C01C 1/00; C01C 1/02; B01D 5/0027; B01D 3/00; B01D 3/14

See application file for complete search history.

(56) References Cited

U.S. PATENT DOCUMENTS

| | | |
|---|---|---|
| 1,114,843 A | 10/1914 | Wright |
| 4,696,799 A | 9/1987 | Noe |

(Continued)

*Primary Examiner* — Jun S Yoo

(74) *Attorney, Agent, or Firm* — Gary M. Machetta

(57) ABSTRACT

A method of revamping vertical converters having a bolt-on flanged pressure shell extension for housing an internal heat exchanger is performed by replacing an existing pressure shell extension with a larger pressure shell extension for housing a plurality of internal heat exchangers.

7 Claims, 6 Drawing Sheets

(51) Int. Cl.
    *C01C 1/02* (2006.01)
    *C01C 1/04* (2006.01)
    *B01D 5/00* (2006.01)

(56) References Cited

U.S. PATENT DOCUMENTS

| | | |
|---|---|---|
| 4,735,780 A | 4/1988 | Noe |
| 7,867,460 B2 | 1/2011 | Singh et al. |
| 2002/0018740 A1 | 2/2002 | Filippi |
| 2004/0045870 A1* | 3/2004 | Wrisberg ............... C10G 49/00 208/59 |
| 2009/0136391 A1* | 5/2009 | Singh .................... B01J 8/0469 422/148 |
| 2010/0116477 A1 | 5/2010 | Mulder |
| 2014/0171709 A1* | 6/2014 | Olbert ...................... C07C 5/48 585/443 |
| 2015/0083365 A1* | 3/2015 | Prabhu ................. F22B 37/206 165/69 |
| 2017/0205147 A1 | 7/2017 | Casale |

* cited by examiner

US 10,960,375 B2

METHOD FOR REVAMPING VERTICAL CONVERTERS HAVING A FLANGED PRESSURE SHELL EXTENSION FOR HOUSING AN INTERNAL HEAT EXCHANGER

CROSS REFERENCE TO RELATED APPLICATION

This application claims priority to U.S. Provisional Patent Application having Ser. No. 62/537,674 filed Jul. 27, 2017, which is incorporated by reference herein.

BACKGROUND

Field

Embodiments of the present invention relate to a method for revamping vertical converters which have a flanged pressure shell extension for housing an internal heat exchanger by replacing the pressure shell extension with a larger extension capable of housing two or more heat exchangers.

Description of the Related Art

Most legacy vertical quench converters (see FIG. 1) with axial-flow beds have been modified over the years to a more efficient design with radial (including axial-radial) beds utilizing small, highly active catalyst for increased conversion and reduced pressure drop. Many of these retrofits also revised the process design from a 4-Bed Quench to a 3-Bed Quench-Intercooled design where indirect quench 29 between beds 23 and 25 is replaced with a more efficient indirect cooling step using a heat exchanger (intercooler). Due to severity of the service, internals for such modified converters are often replaced when a new catalyst charge is installed.

The competitiveness of the converter revamp market continues to drive the need for more efficient designs. Increasing the efficiency of the fundamental process design typically involves adding more process beds and associated cooling steps and/or replacing direct quench cooling steps with indirect cooling steps. For example, a 3-Bed Quench-Intercooled system can be upgraded to a 3-Bed Intercooled system using indirect cooling between beds 21 and 23 as well as beds 23 and 25. However, since the existing converter has a fixed volume, the improvement in performance from addition of the second intercooler is reduced by the lost catalyst volume taken up by the intercooler. In addition, the ability to add process beds and additional cooling steps is limited by the number of available nozzles on the existing converter pressure shell.

Legacy quench converters 8 typically include an internal feed/effluent heat exchanger 10 for bringing the main converter feed up to reaction temperature. The F/E exchanger 10 is housed in a pressure shell extension (bonnet) 12 attached via a flanged connection 14 to the top pressure shell head 16 of the main converter body 18 (see FIG. 1). During a converter revamp, the F/E exchanger 10 is often replaced with a new design which better fits the new loads, reduces pressure drop, or simply addresses maintenance issues with the existing exchanger. If the F/E exchanger 10 is replaced, the new exchanger is designed to conform with the details and dimensions of the existing bonnet 12 which is reused in the revamped converter. Reuse of the bonnet 12 is a standard part of the converter revamp paradigm which seeks to minimize cost for a new converter system by reusing the old converter pressure shell.

SUMMARY OF THE INVENTION

Briefly in accordance with aspects of the present technique, a method is provided for revamping a vertical converter with an internal heat exchanger housed in a flanged pressure shell extension by replacing the pressure shell extension with a larger extension capable of housing two or more heat exchangers.

BRIEF DESCRIPTION OF THE DRAWINGS

The present invention will be described in detail with references to the accompanying figure wherein.

DETAILED DESCRIPTION

Embodiments of the present invention remove the shortcomings of the prior art by replacing the bonnet with a new and larger bonnet of sufficient size to house not only the F/E exchanger but also one or more intercoolers. The bonnet may be increased in length, increased in diameter (with an appropriate neck—down in diameter at the bottom flanged connection), or a combination of the both aspects.

The new and larger bonnet effectively increases the total volume available for the new converter system minimizing the loss in installed catalyst volume from using one or more intercoolers in the modified process design. In addition, one or more inlet nozzles can be included on the new bonnet allowing the number of process beds and associated cooling steps to be increased.

Figure 1:
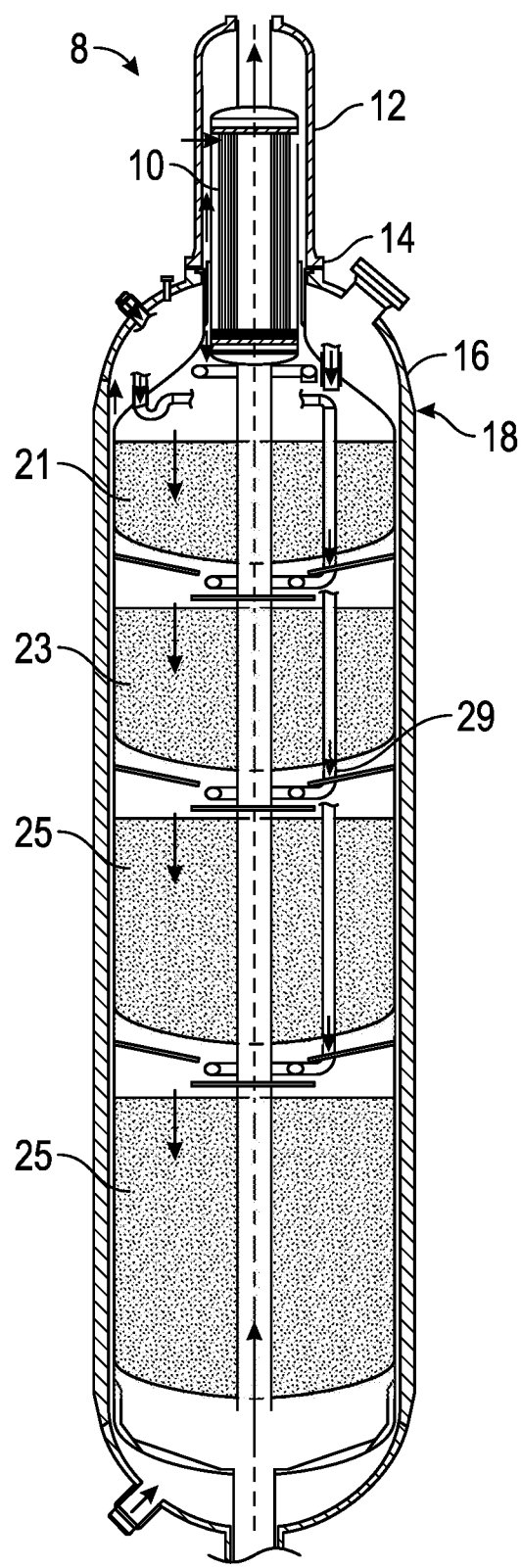
FIG. 1 depicts a schematic view of a of legacy vertical converter with 4-bed quench design according to the prior art.
Figure 2:
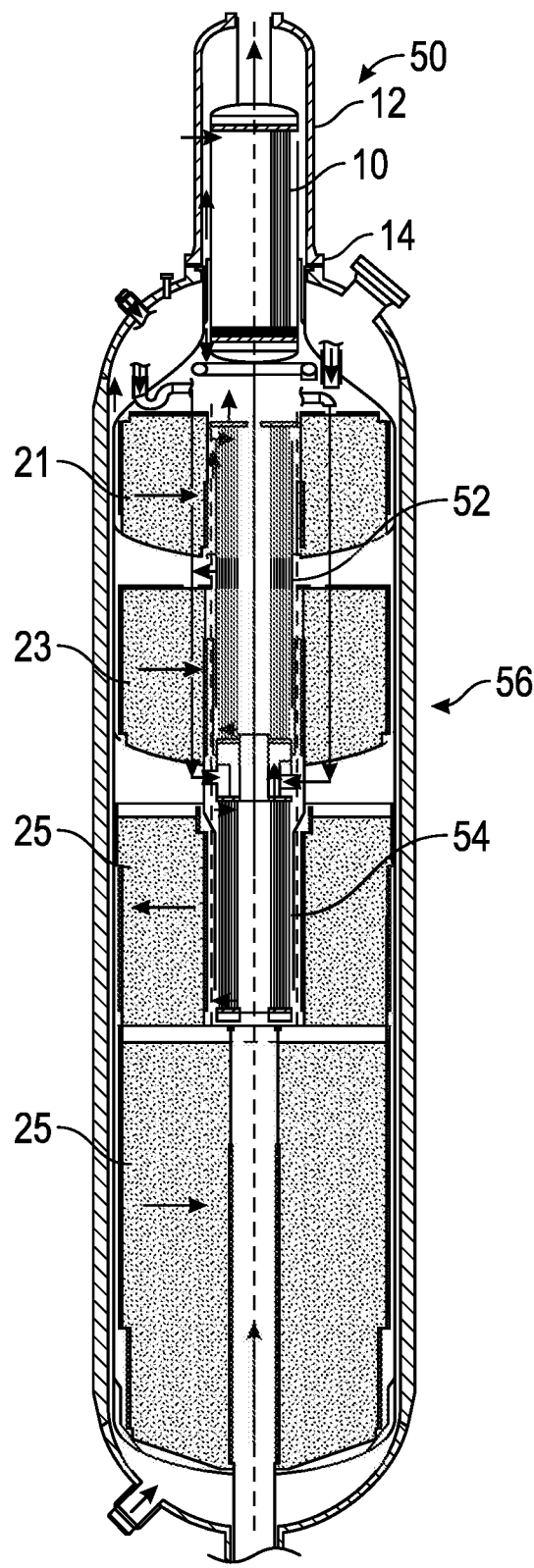
FIG. 2 is a schematic diagram depicting the ammonia converter basket revamp 3-bed intercooled design according to aspects of the present invention.

A simplified schematic of a previously proposed design for a 3-Bed Intercooled system 50 is shown in FIG. 2. It may be noted that both intercoolers 52, 54 are located in the main converter basket shell 56.

Figure 3:
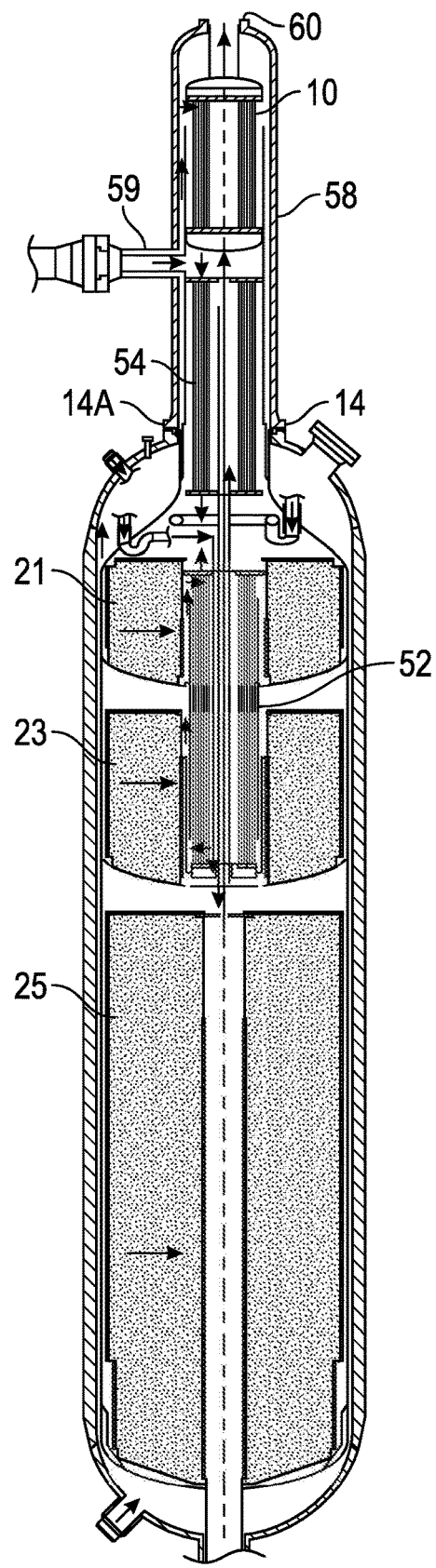
FIG. 3 depicts a schematic view of ammonia converter basket revamp including a bonnet in accordance with aspects of the present invention.
Figure 3A:
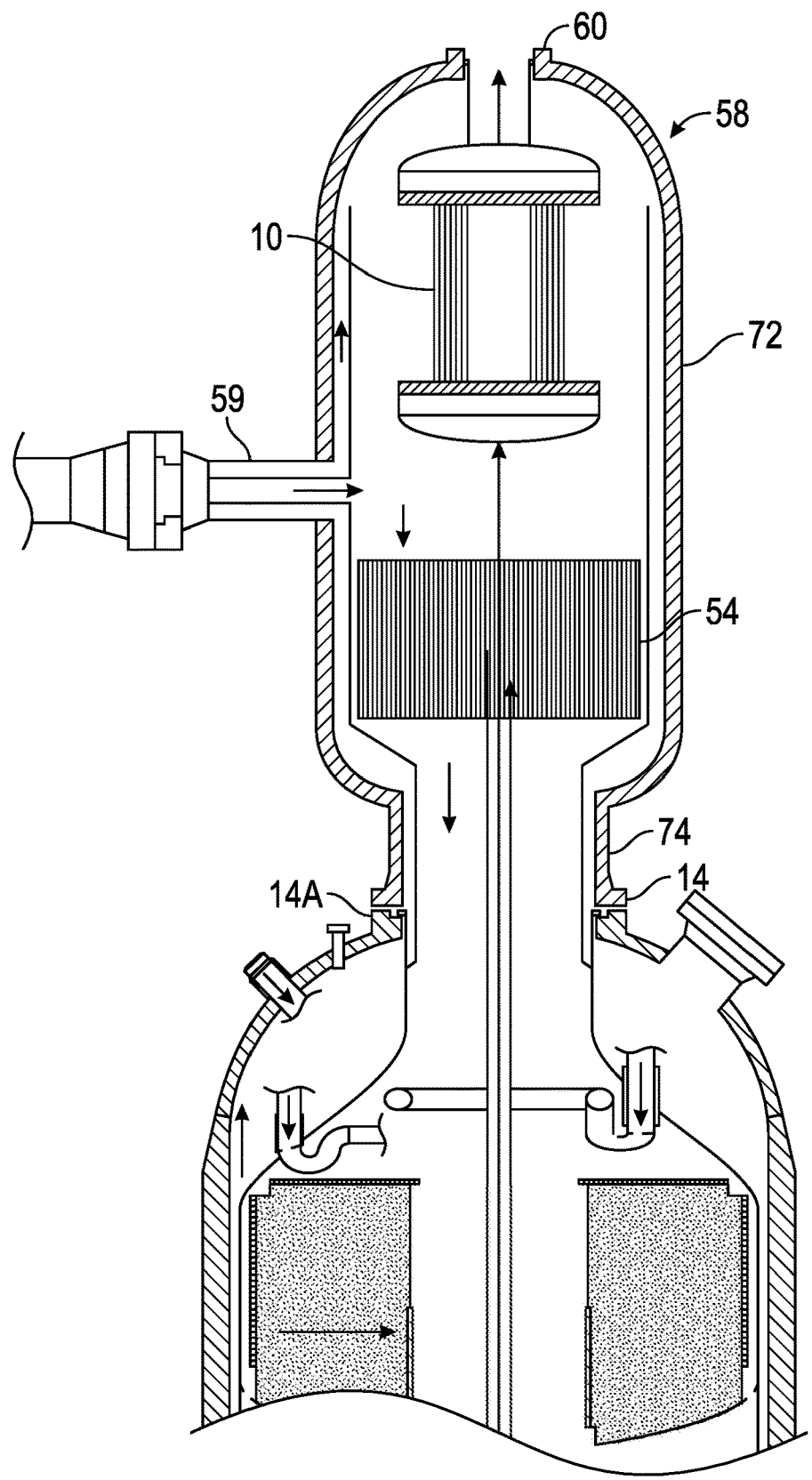
FIG. 3A depicts a section of the FIG. 3 embodiment in an enlarged format.

The disclosed method has been applied as shown in FIGS. 3 and 3A wherein the second intercooler 54 has been relocated to the lower part of the bonnet 58 allowing additional catalyst to be installed in the bed 25 previously surrounding this intercooler 54.

Figure 4:
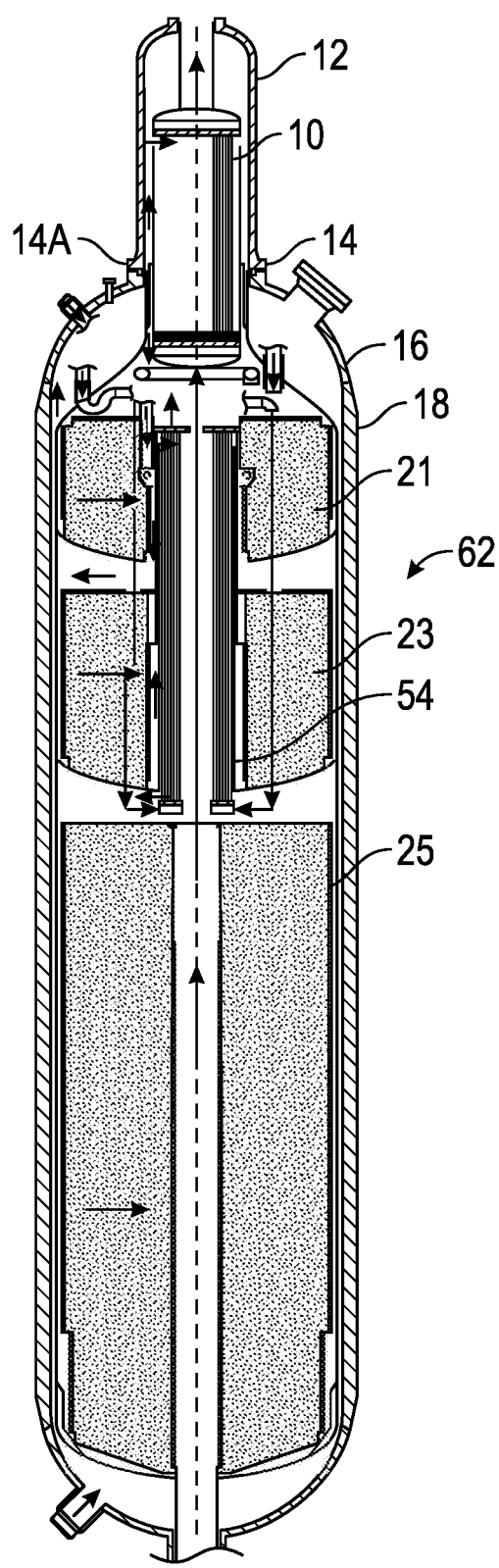
FIG. 4 depicts another embodiment of the ammonia converter basket revamp 3-bed quench intercooled design, according to the aspects of the invention.
Figure 5:
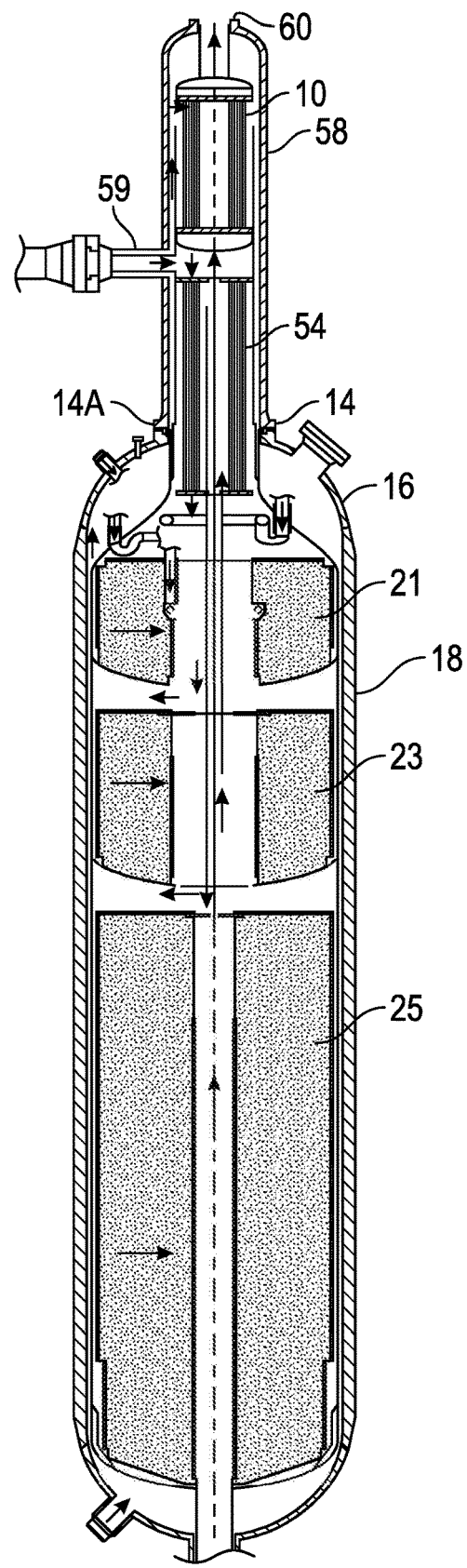
FIG. 5 depicts another embodiment of the ammonia converter basket revamp 3-bed quench intercooled design with the bonnet, according to the aspects of the invention

A simplified schematic of a 3-Bed Quench Intercooled system 62 is shown in FIG. 4 wherein the intercooler 54 cooling bed 23 effluent sits in the middle of beds 21 and 23. The disclosed method has been applied as shown in FIG. 5 increasing the catalyst volume in both beds 21, 23.

Although the increased bonnet size adds load to the top flanged connection 14 on the main converter shell 18 the entire converter basket and internals including the weight of the loaded catalyst charge already hangs from the top head 16 flange 14A, so a proportionally large increase in bonnet size is easily accommodated within the mechanical design margins on the flange 14A.

The novel method disclosed according to the present invention has several advantages such as but not limited to Method allows more catalyst to be installed in a legacy quench converter revamp when using one or more intercoolers in the revamped process design providing for increased conversion to support greater energy savings and/or higher capacity.

The invention includes a method of revamping vertical converters having a bolt-on flanged pressure shell extension 12 for housing an internal heat exchanger 10. The method comprises replacing an existing pressure shell extension 12 with a larger pressure shell extension 58 for housing a plurality of internal heat exchangers. The larger pressure shell extension 58 may comprise one or more converter inlet nozzles 59 and a converter outlet nozzle 60. Additionally, the larger pressure shell extension 58 may have a substantially similar diameter as a diameter of an original pressure shell extension 12 and greater length than the original pressure shell extension 12. Another alternative may include the larger pressure shell extension 58 comprising an upper section 72 of larger diameter than the original pressure shell extension 12 and a lower flanged section 74 of smaller diameter than the upper section to match with the existing main converter pressure shell flange 14A.

The invention also includes an existing feed-effluent exchanger 10 or a replacement feed-effluent exchanger housed in the larger pressure shell extension 58. An additional alternative variation may also be inclusive of one or more inter-bed heat exchangers 52, 54 used for cooling reactant gases from a catalyst bed are housed in the larger pressure shell extension 58.

Various terms have been defined above. To the extent a term used in a claim is not defined above, it should be given the broadest definition persons in the pertinent art have given that term as reflected in at least one printed publication or issued patent. And if applicable, all patents, test procedures, and other documents cited in this application are fully incorporated by reference to the extent such disclosure is not inconsistent with this application and for all jurisdictions in which such incorporation is permitted.

While the foregoing is directed to certain illustrative embodiments, other and further embodiments of the invention can be devised without departing from the basic scope thereof, and the scope thereof is determined by the claims that follow.

The invention claimed is:

1. A method of revamping vertical converters having an existing bolt-on flanged pressure shell extension for housing an internal heat exchanger,
the method comprising:
replacing the existing bolt-on pressure shell extension with a larger pressure shell extension having a housing in which a plurality of internal heat exchangers are positioned,
wherein an existing feed-effluent exchanger or a replacement feed-effluent exchanger is housed in the larger pressure shell extension.

2. The method of claim 1, wherein the larger pressure shell extension comprises one or more converter inlet nozzles and a converter outlet nozzle.

3. The method of claim 1, wherein the larger pressure shell extension has a substantially similar diameter as a diameter of the existing bolt-on pressure shell extension and greater length than the existing bolt-on pressure shell extension.

4. The method of claim 1, wherein the larger pressure shell extension comprises an upper section of larger diameter than the existing bolt-on pressure shell extension and a lower flanged section of smaller diameter than the upper section to match with an existing main converter pressure shell flange.

5. The method of claim 1, wherein one or more inter-bed heat exchangers used for cooling reactant gases from a catalyst bed are housed in the larger pressure shell extension.

6. The method of claim 1, further comprising positioning the plurality of internal heat exchangers in the larger pressure shell extension.

7. The method of claim 1, wherein the larger pressure shell extension further houses one or more intercoolers.

* * * * *